US012787125B2

(12) United States Patent
Chen

(10) Patent No.: US 12,787,125 B2
(45) Date of Patent: Nov. 3, 2026

(54) ELECTRONIC VAPORIZATION DEVICE AND VAPORIZER AND HEATING ASSEMBLY THEREOF

(71) Applicant: Jiangmen Moore Technology., Ltd, Jiangmen (CN)

(72) Inventor: Long Chen, Jiangmen (CN)

(73) Assignee: JIANGMEN MOORE TECHNOLOGY., Ltd, Guangdong (CN)

(*) Notice: Subject to any disclaimer, the term of this patent is extended or adjusted under 35 U.S.C. 154(b) by 771 days.

(21) Appl. No.: 18/310,195

(22) Filed: May 1, 2023

(65) Prior Publication Data

US 2023/0371133 A1 Nov. 16, 2023

(30) Foreign Application Priority Data

May 12, 2022 (CN) ......................... 202221159374.4

(51) Int. Cl.
*H05B 3/22* (2006.01)

(52) U.S. Cl.
CPC ..................................... *H05B 3/22* (2013.01)

(58) Field of Classification Search
CPC ........ H05B 2203/021; H05B 2203/022; H05B 3/04; H05B 3/22; H05B 3/42
USPC .......................................................... 392/394
See application file for complete search history.

(56) References Cited

U.S. PATENT DOCUMENTS 3,801,954 A * 4/1974 Dorrell ............. H01R 13/6277 285/82
2001/0002939 A1 * 6/2001 Aizawa ................ F16C 33/726 384/477

FOREIGN PATENT DOCUMENTS

CN 106617324 * 5/2017
CN 216853825 U 7/2022

* cited by examiner

*Primary Examiner* — Ibrahime A Abraham
*Assistant Examiner* — Joseph W Iskra
(74) *Attorney, Agent, or Firm* — Sughrue Mion, PLLC

(57) ABSTRACT

A heating assembly includes: a heating bowl; a base having a first electrode and a second electrode, the base carrying the heating bowl, the first electrode and the second electrode being electrically connected to the heating bowl; and an elastic engagement piece arranged on the base, the elastic engagement piece locking the heating bowl on the base when heated, and releasing the heating bowl at a normal temperature.

11 Claims, 13 Drawing Sheets

ELECTRONIC VAPORIZATION DEVICE AND VAPORIZER AND HEATING ASSEMBLY THEREOF

CROSS-REFERENCE TO PRIOR APPLICATION

Priority is claimed to Chinese Patent Application No. 202221159374.4, filed on May 12, 2022, the entire disclosure of which is hereby incorporated by reference herein.

FIELD

This application relates to the field of vaporization technologies, and in particular, to an electronic vaporization device and a vaporizer and a heating assembly thereof.

BACKGROUND

During operation of an electronic vaporization device using a heating bowl for baking, an aerosol-forming substrate (for example, plant leaves) filled in the heating bowl is heated to generate an aerosol for inhalation by a user. However, heating bowls of current electronic vaporization devices on the market cannot be disassembled or cannot be easily disassembled or assembled.

SUMMARY

In an embodiment, the present invention provides a heating assembly, comprising: a heating bowl; a base comprising a first electrode and a second electrode, the base being configured to carry the heating bowl, the first electrode and the second electrode being configured to be electrically connected to the heating bowl; and an elastic engagement piece arranged on the base, the elastic engagement piece being configured to lock the heating bowl on the base when heated, and release the heating bowl at a normal temperature.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
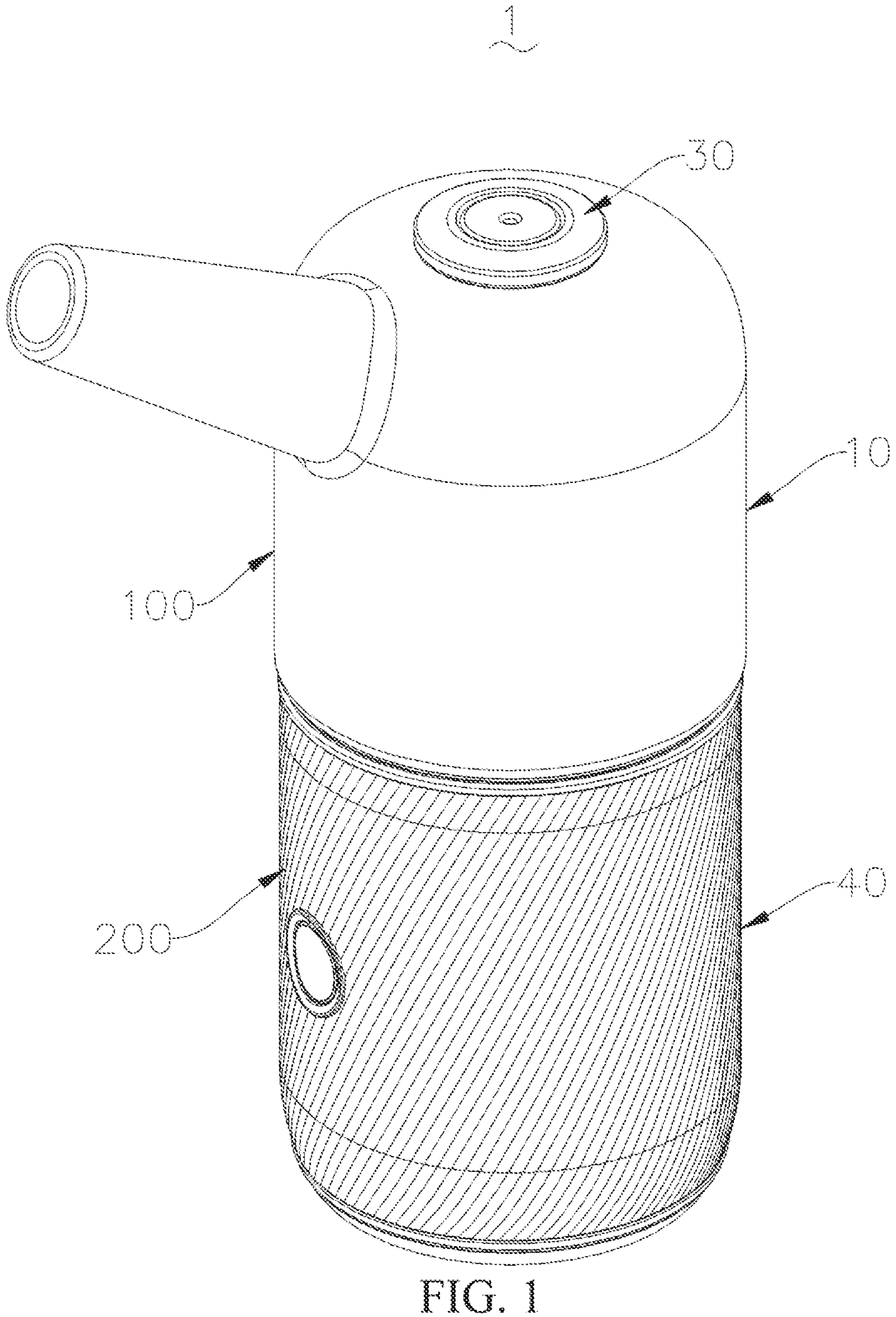
FIG. 1 is a schematic structural diagram of an embodiment of an electronic vaporization device according to this application.

In an embodiment, the present invention provides an electronic vaporization device and a vaporizer and a heating assembly thereof, to resolve a problem that a heating bowl cannot be easily disassembled or assembled.

In an embodiment, the present invention provides a heating assembly. The heating assembly includes: a heating bowl; a base, provided with a first electrode and a second electrode, and configured to carry the heating bowl, where the first electrode and the second electrode are configured to be electrically connected to the heating bowl; and an elastic engagement piece, arranged on the base, and configured to lock the heating bowl on the base when heated, and release the heating bowl at normal temperature.

In some embodiments, the elastic engagement piece includes two elastic arms, in a heated state, the two elastic arms are heated and deformed inward, so as to lock the heating bowl; and at normal temperature, the two elastic arms are released from a heating constraint and restore to open outward, so as to release the heating bowl.

In some embodiments, each of the elastic arms includes a connected deformable section and non-deformable section, the non-deformable section is attached to a side wall of the base, the deformable section of each of the two elastic arms is in an open state at normal temperature, and the deformable section is deformed inward when heated, so as to lock the heating bowl. In some embodiments, the elastic engagement piece further includes a connection portion, the two elastic arms are connected to two sides of the connection portion, the connection portion is detachably connected to an end of the base away from the heating bowl, and the non-deformable section is further clamped to the side wall of the base.

In some embodiments, the heating assembly further includes:

- a limiting component, where the base and the heating bowl are movably accommodated in the limiting component, and the heating bowl is movable between a first position and a second position relative to the limiting component; and
- a self-locking component, where the self-locking component is accommodated in the limiting component, is connected to the base, and has a locked state of being engaged with the limiting component and an unlocked state of being disengaged from the limiting component, where
- the heating bowl is pressed against the base, and the self-locking component is switched from the locked state to the unlocked state when the heating bowl is pressed at the first position; the self-locking component pushes the heating bowl to move to the second position when the self-locking component is switched from the locked state to the unlocked state; and when the heating bowl is pressed at the second position, the self-locking component is pushed to move and the self-locking component is switched from the unlocked state to the locked state.

In some embodiments, a side wall of the limiting component is provided with a first engagement groove and a second engagement groove; and the self-locking component includes a self-locking piece, and the self-locking piece is engaged with the first engagement groove or the second engagement groove to lock or unlock the self-locking component.

In some embodiments, the self-locking component includes a support piece that is slidably accommodated in the limiting component and the self-locking piece, the support piece is connected to the base, and the self-locking piece is arranged at an end of the support piece away from the base, where the support piece presses against the self-locking piece, to cause the self-locking piece to be first engaged with the first engagement groove and then engaged with the second engagement groove, so as to unlock the self-locking component; or to cause the self-locking piece to be first engaged with the second engagement groove and then engaged with the first engagement groove, so as to lock the self-locking component.

In some embodiments, the side wall of the limiting component is provided with a plurality of first engagement grooves and a plurality of second engagement grooves, the plurality of first engagement grooves and second engagement grooves are circumferentially provided on the side wall of the limiting component, the first engagement grooves and the second engagement grooves are alternately provided, and a side wall of each of the second engagement grooves is connected to side walls of two adjacent first engagement grooves on two sides through a first guide wall and a second guide wall respectively, where the self-locking piece is first engaged with each of the first engagement grooves and then engaged with each of the second engagement grooves along the first guide wall, and the self-locking piece is first engaged with each of the second engagement grooves and then engaged with each of the first engagement grooves along the second guide wall.

In some embodiments, a slidable block that protrudes outward is formed on a side wall of the support piece, and the slidable block is slidably arranged in each of the second engagement grooves; an abutting wall that protrudes toward an end portion of the self-locking piece is formed on the support piece, and an abutting wall surface of the abutting wall is parallel to guide wall surfaces of the first guide wall and the second guide wall; and a bump is formed on a side wall of the self-locking piece, the bump includes a first sliding portion and a second sliding portion, the first sliding portion is configured to slide-fit each of the second engagement grooves, the second sliding portion is configured to be engaged with each of the first engagement grooves, the second sliding portion is provided with a sliding wall surface abutting against the abutting wall surface, and the sliding wall surface is arranged parallel to the guide wall surfaces, where the second sliding portion slides along the abutting wall surface to match with the guide wall surface of the first guide wall or the second guide wall.

In some embodiments, the self-locking component further comprises a first elastic piece and a second elastic piece, two ends of the first elastic piece are respectively connected to the self-locking piece and the limiting component, and two ends of the second elastic piece are respectively connected to the support piece and the limiting component, wherein the first elastic piece is configured to push the heating bowl to move to the second position.

In order to resolve the technical problem, another technical solution adopted in this application is to provide a vaporizer. The vaporizer includes the heating assembly as described above.

In order to resolve the technical problem, another technical solution adopted in this application is to provide an electronic vaporization device. The electronic vaporization device includes the vaporizer as described above.

The beneficial effects of this application are: different from a situation in the related art, this application discloses an electronic vaporization device and a vaporizer and a heating assembly thereof. A heating bowl is locked or released by arranging an elastic engagement piece, where the elastic engagement piece is arranged on a base, which is configured to lock the heating bowl on the base when heated, and release the heating bowl at normal temperature, so that the heating bowl can be disassembled or assembled very conveniently and quickly.

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In this embodiment of this application, the terms “first”, “second” and “third” are used merely for the purpose of description, and shall not be construed as indicating or implying relative importance or implying a quantity of indicated technical features. Therefore, features defining “first” “second” and “third” can explicitly or implicitly include at least one of the features. In description of this application, “more” means at least two, such as two and three unless it is specifically defined otherwise. In addition, the terms “include”, “have”, and any variant thereof are intended to cover a non-exclusive inclusion. For example, a process, method, system, product, or device that includes a series of steps or units is not limited to the listed steps or units; and instead, further optionally includes a step or unit that is not listed, or further optionally includes another step or unit that is intrinsic to the process, method, product, or device. “Embodiment” mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

Figure 2:
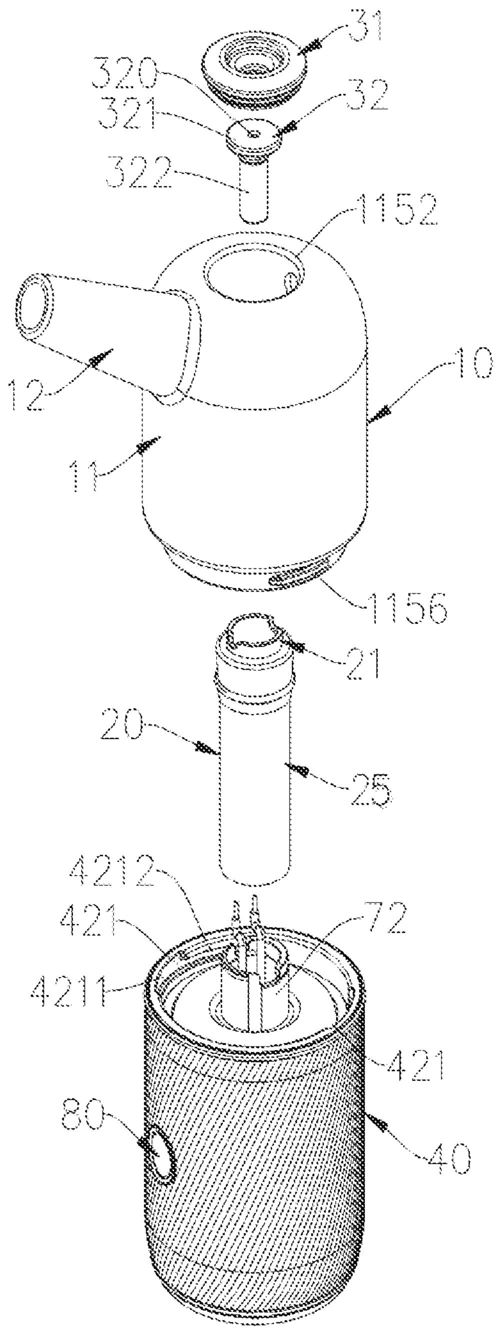
FIG. 2 is a schematic structural exploded view of the electronic vaporization device shown in FIG. 1.
Figure 3:
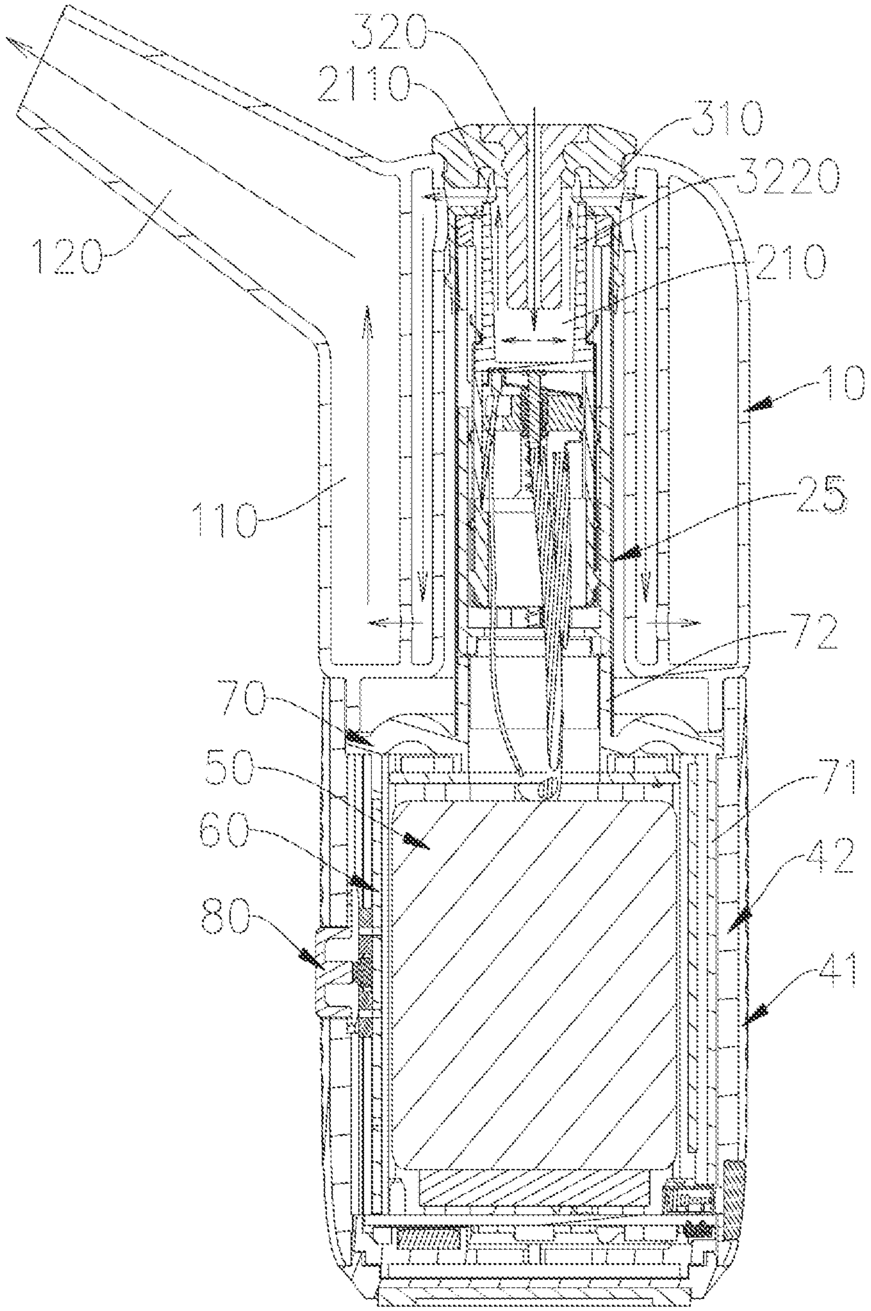
FIG. 3 is a schematic diagram of a cross-sectional structure of the electronic vaporization device shown in FIG. 1.

FIG. 1 to FIG. 3 show an electronic vaporization device 1 according to some embodiments of the present utility model. The electronic vaporization device 1 may be substantially in a shape of a round cylinder, and may include a main unit 200 and a vaporizer 100 arranged above the main unit 200 along a longitudinal direction.

The main unit 200 is mainly configured to supply power to the vaporizer 100, and may control turn-on and turn-off of the entire electronic vaporization device. The vaporizer 100 is configured to accommodate an aerosol-forming substrate, and to heat and vaporize the aerosol-forming substrate after being electrified, so as to generate an aerosol for inhalation by a user. The aerosol-forming substrate may be in a form of a plant leave, a paste, or a gel.

It may be understood that in other embodiments, the shape of the electronic vaporization device 1 is not limited to the shape of a round cylinder, but may also be other shapes such as the shape of an elliptical cylinder, the shape of a square cylinder, or the shape of a flat cylinder.

In some embodiments, the main unit 200 may include a shell 40, a battery 50, a circuit board 60, a holder 70, and a button 80. The battery 50, the circuit board 60, and the holder 70 are all accommodated in the shell 40. A related control circuit is arranged on the circuit board 60. The control circuit is electrically connected to the battery 50 and a heating assembly 20 respectively for controlling the battery 50 to supply power to the heating assembly 20. The button 80 is arranged on a side wall of the shell 40 and is configured to receive an operation performed by a user, so as to turn on the circuit board 60 to control the battery 50 to supply power to the heating assembly 20.

The shell 40 may be in a shape of a cylinder, and may include a cylindric first shell 41 located outside and a second cylindric shell 42 located inside. The second shell 42 may be a hard shell, which provides support and protection. The first shell 41 is sleeved outside the second shell 42. The first shell may be made of a soft material such as a soft glue, which can improve a touch feeling for a user.

In some embodiments, the holder 70 may include a holder body 71 accommodated in the shell 40 and a sleeve portion 72 extending upward from a top wall of the holder body 71. The holder body 71 may be in a shape of a cylinder having an opening on a side. The battery 50 may be accommodated in the holder body 71, and the circuit board 60 may be arranged on the side of the holder body 71 having the opening and arranged corresponding to the button 80. The sleeve portion 72 may be in a shape of a cylinder, and may be formed by integrally extending upward from the top wall of the holder body 71. The sleeve portion 72 may extend out of the shell 40 and is configured to be sleeved on and connected to the heating assembly 20.

The vaporizer 100 may include a nozzle integrated condensation cap 10 with an accommodating cavity 1130 formed therein and the heating assembly 20 accommodated in the accommodating cavity 1130. The nozzle integrated condensation cap 10 is arranged above the main unit 200 along the longitudinal direction and may be detachably connected to the main unit 200 by screwing, magnetic connection, engagement, or the like. The heating assembly 20 includes a heating bowl 21, and a vaporization cavity 210 configured to accommodate and heat the aerosol-forming substrate is formed in the heating bowl 21. A cooling channel 110 and an inhalation channel 120 in communication with the vaporization cavity 210 in sequence are formed in the nozzle integrated condensation cap 10. An aerosol generated after the aerosol-forming substrate is heated and vaporized is cooled through the cooling channel 110 and then outputted through the inhalation channel 120 for inhalation by a user.

In some embodiments, the nozzle integrated condensation cap 10 may be made of glass or the like, and may include a cap body 11 and a nozzle 12 connected to the cap body 11. The inhalation channel 120 is formed in the nozzle 12, and the cooling channel 110 is formed in the cap body 11. Condense water may be further provided in the cooling channel 110. An aerosol passes through the condense water to be condensed and to filter out an impurity in the aerosol for inhalation by the user.

Figure 4:
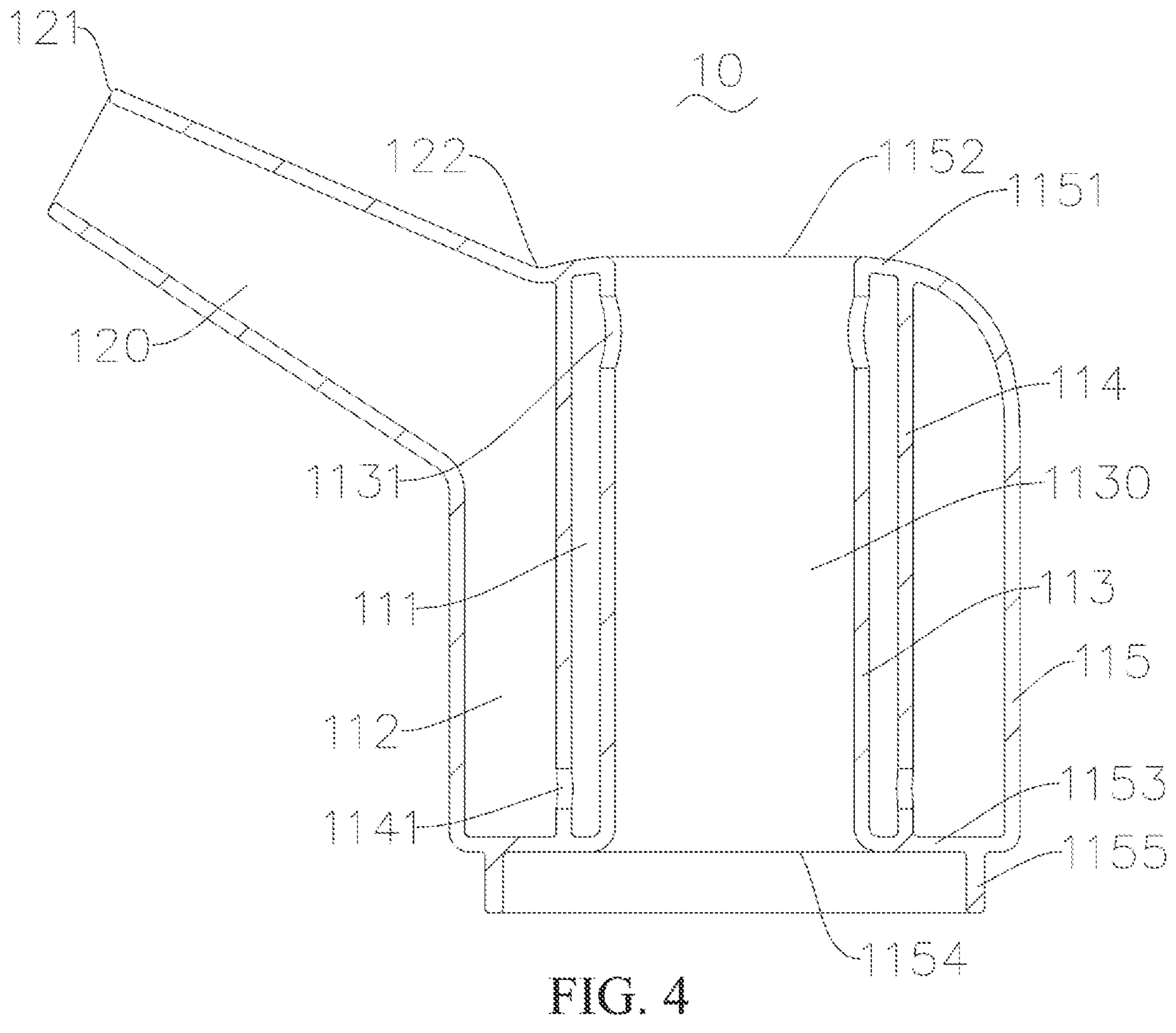
FIG. 4 is a schematic diagram of a cross-sectional structure of a nozzle integrated condensation cap in the electronic vaporization device shown in FIG. 1.

As shown in FIG. 3 to FIG. 4, in some embodiments, the cap body 11 may include an outer cap 115 and a first isolating wall 113 and a second isolating wall 114 arranged in the outer cap 115. The outer cap 115 may be substantially in a shape of a cylinder, and an outer diameter thereof may be the same as an outer diameter of the shell 40. A top of the outer cap 115 has an annular top wall 1151. The top wall 1151 may cover an upper end of the cooling channel 110, and an inner wall surface of the top wall 1151 defines a first opening 1152 in communication with the accommodating cavity 1130. A bottom of the outer cap 115 has an annular bottom wall 1153. The bottom wall 1153 may cover a lower end of the cooling channel 110, and an inner wall surface of the bottom wall 1153 defines a second opening 1154 in communication with the accommodating cavity 1130. The cap body 11 may further include an annular connection portion 1155 formed by integrally extending downward from a lower end surface of the bottom wall 1153. At least one spiral engagement protrusion 1156 that protrudes outward may be formed on an outer wall surface of the connection portion 1155, and at least one spiral engagement groove 421 is correspondingly arranged on an inner wall surface of an upper end of the second shell 42. The spiral engagement protrusion 1156 is rotably engaged in the spiral engagement groove 421 to mount the vaporizer 100 to the main unit 200. Specifically, in this embodiment, two spiral engagement protrusions 1156 are arranged. Each of the spiral engagement protrusions 1156 extends along a circumferential direction of the connection portion 1155, and the two spiral engagement protrusions 1156 are respectively rotationally and symmetrically arranged on two sides of the connection portion 1155 in a circumferential direction. Correspondingly, two spiral engagement grooves 421 are arranged. The two spiral engagement grooves 421 are respectively rotationally and symmetrically arranged on two sides of the second shell 42 in a circumferential direction. Each of the spiral engagement grooves 421 has a guide end 4211 and a locking end 4212 arranged oppositely along a circumferential direction. During assembly, the spiral engagement protrusion 1156 is guided into the spiral engagement groove 421 along the guide end 4211, and is then rotated by a set angle (for example, 10° to 30°) to the locking end 4212, so as to lock and fix the nozzle integrated condensation cap 10 to the second shell 42. During disassembly, the nozzle integrated condensation cap 10 is rotated reversely by a set angle, so that the spiral engagement protrusion 1156 is rotated from the locking end 4212 to the guide end 4211. In this way, the nozzle integrated condensation cap 10 can be taken out from the second shell 42. The locking or take-out by rotation uses a simple structure and is convenient to operate.

The first isolating wall 113 may integrally extend downward from the top wall 1151 to the bottom wall 1153. The first isolating wall 113 may be annular and may be arranged coaxially with the outer cap 115. An inner wall surface of the first isolating wall 113 defines an accommodating cavity 1130 configured to accommodate the heating assembly 20.

An inner diameter of the first isolating wall 113 may be substantially equal to pore sizes of the first opening 1152 and the second opening 1154.

The second isolating wall 114 may integrally extend downward from the top wall 1151 to the bottom wall 1153, and the second isolating wall 114 may be annular and may be arranged coaxially with the outer cap 115. The second isolating wall 114 is located between the outer cap 115 and the first isolating wall 113, and is spaced apart from the outer cap 115 and from the first isolating wall 113. A first cooling channel 111 is defined between an inner wall surface of the second isolating wall 114 and an outer wall surface of the first isolating wall 113, and a second cooling channel 112 is defined between an outer wall surface of the second isolating wall 114 and an inner wall surface of the outer cap 115. That is, the accommodating cavity 1130, the first cooling channel 111, and the second cooling channel 112 all extend along the longitudinal direction. The first cooling channel 111 is annular and is arranged on a periphery of the accommodating cavity 1130, and the second cooling channel 112 is annular and is arranged on a periphery of the first cooling channel 111. Since the first cooling channel 111 and the second cooling channel 112 are annular, a relatively large accommodating space is available for accommodating a condensate.

At least one first air outlet 1131 configured to communicate the accommodating cavity 1130 with the first cooling channel 111 is arranged on the first isolating wall 113, and at least one second air outlet 1141 configured to communicate the first cooling channel 111 with the second cooling channel 112 is arranged on the second isolating wall 114. The first air outlet 1131, the first cooling channel 111, the second air outlet 1141, and the second cooling channel 112 are in communication in sequence and form the cooling channel 110. In this embodiment, two first air outlets 1131 are symmetrically arranged on two sides of the first isolating wall 113 in a circumferential direction. Two second air outlets 1141 are symmetrically arranged on two sides of the second isolating wall 114 in a circumferential direction. The two second air outlets 1141 may be respectively arranged corresponding to the two first air outlets 1131. That is, a line connecting the two second air outlets 1141 may be parallel to a line connecting the two first air outlets 1131. It may be understood that in other embodiments, one or more first air outlets 1131 and one or more second air outlet 1141 may be arranged. In some other embodiments, an included angle may be formed between the line connecting the two second air outlets 1141 and the line connecting the two first air outlets 1131. For example, the included angle is 90 degrees.

Preferably, flowing directions of a vapor in the first cooling channel 111 and the second cooling channel 112 are opposite. The first air outlet 1131 is arranged on a side wall of the upper end of the first isolating wall 113, and may be located below the top wall 1151 and close to the top wall 1151. The second air outlet 1141 may be arranged on a side wall of the lower end of the second isolating wall 114 and close to the bottom wall 1153. The upper end of the second cooling channel 112 is in communication with the inhalation channel 120, so that the cooling channel 110 is relatively long, thereby implementing more effective condensation and filtering.

In some embodiments, the vaporizer 100 may further include a seal plug 30 detachably arranged at the first opening 1152. A vent hole 320 may be formed on the seal plug 30 along a longitudinal direction. The vent hole 320 is in communication with the vaporization cavity 210 and may be arranged coaxially with the vaporization cavity 210, so as to communicate the vaporization cavity 210 with an outside. In some embodiments, the seal plug 30 may include an annular seal portion 31 and a vent portion 32 extending through the seal portion 31. An outer wall surface of the seal portion 31 is hermetically engaged with a hole wall of the first opening 1152. The seal portion 31 may be made of an elastic material such as silica gel, which has a good sealing effect and can be easily inserted and removed. The vent portion 32 extends through the seal portion 31 along a longitudinal direction, and the vent hole 320 is formed on the vent portion 32 along the longitudinal direction. The vent portion 32 may be made of a hard material such as glass, so that air passes through the vent hole 320 smoothly, thereby preventing blocking of the vent hole 320. The vent portion 32 may include a top portion 321 located above and a rod portion 322 located below. An outer diameter of the top portion 321 is greater than that an outer diameter of the rod portion 322. The top portion 321 is embedded into the seal portion 31, and the rod portion 322 may pass through the seal portion 31 and extend downward into the vaporization cavity 210. The outer diameter of the rod portion 322 is less than an inner diameter of the heating bowl 21, so that a first vent gap 3220 for gas circulation is formed between an outer wall surface of the rod portion 322 and an inner wall surface of the heating bowl 21. A second vent gap 310 that communicates the first vent gap 3220 with the first air outlet 1131 is further formed between an upper end surface of the heating assembly 20 and a lower end surface of the seal portion 31. As shown by arrows in FIG. 3, air enters the vaporization cavity 210 through the vent hole 320, and is mixed with an aerosol generated after vaporization in the vaporization cavity 210, and a vapor obtained after the air is mixed with the aerosol enters an upper end of the first cooling channel 111 through the first vent gap 3220, the second vent gap 310, and the first air outlet 1131 in sequence, and flows downward in the first cooling channel 111 to the second air outlet 1141 at the lower end, and then enters the second cooling channel 112 through the second air outlet 1141 and flows upward in the second cooling channel 112, and is finally outputted through the inhalation channel 120.

The nozzle 12 may be tubular. An inner wall surface thereof defines the inhalation channel 120. The nozzle 12 may be arranged on a side of the outer cap 115 corresponding to one of the second air outlets 1141, and may be formed by integrally extending from an outer wall surface of the outer cap 115. The nozzle 12 has an inhalation end 121 away from the outer cap 115 and a connection end 122 connected to the outer cap 115. The nozzle 12 may be arranged obliquely upward, so that the inhalation end 121 is at a higher position than the connection end 122, which facilitates inhalation by the user. An outer diameter and an inner diameter of the nozzle 12 may gradually decrease from the connection end 122 toward the inhalation end 121, so that a pore size of the inhalation channel 120 gradually decreases from the connection end 122 toward the inhalation end 121. In this way, the vapor at the inhalation end 121 is more concentrated, and inhalation experience is more desirable. In addition, the outer diameter of the nozzle 12 at the inhalation end 121 is relatively small, which helps the user hold the nozzle in the mouth.

Figure 5:
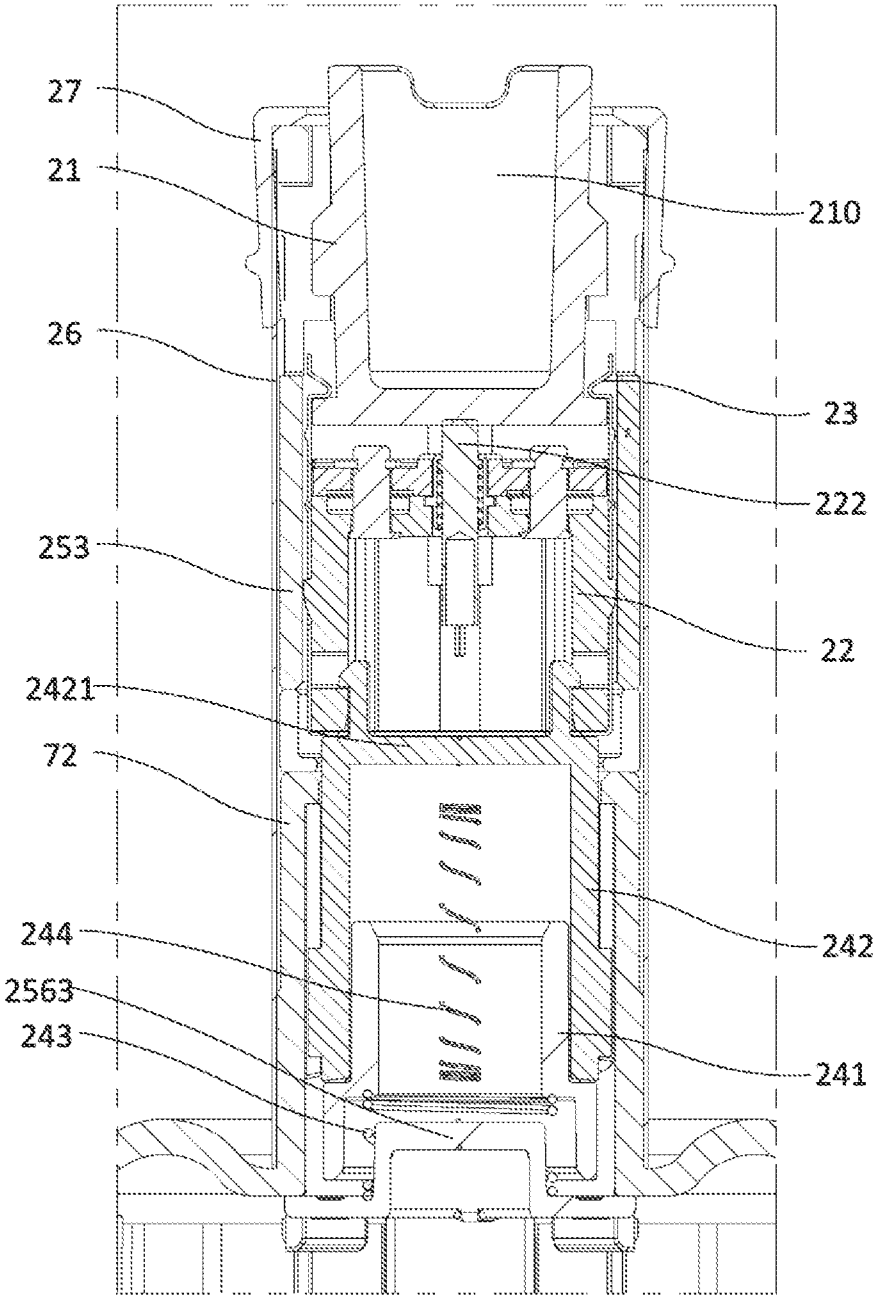
FIG. 5 is a schematic partially enlarged structural view of a heating assembly in the electronic vaporization device shown in FIG. 2.
Figure 6:
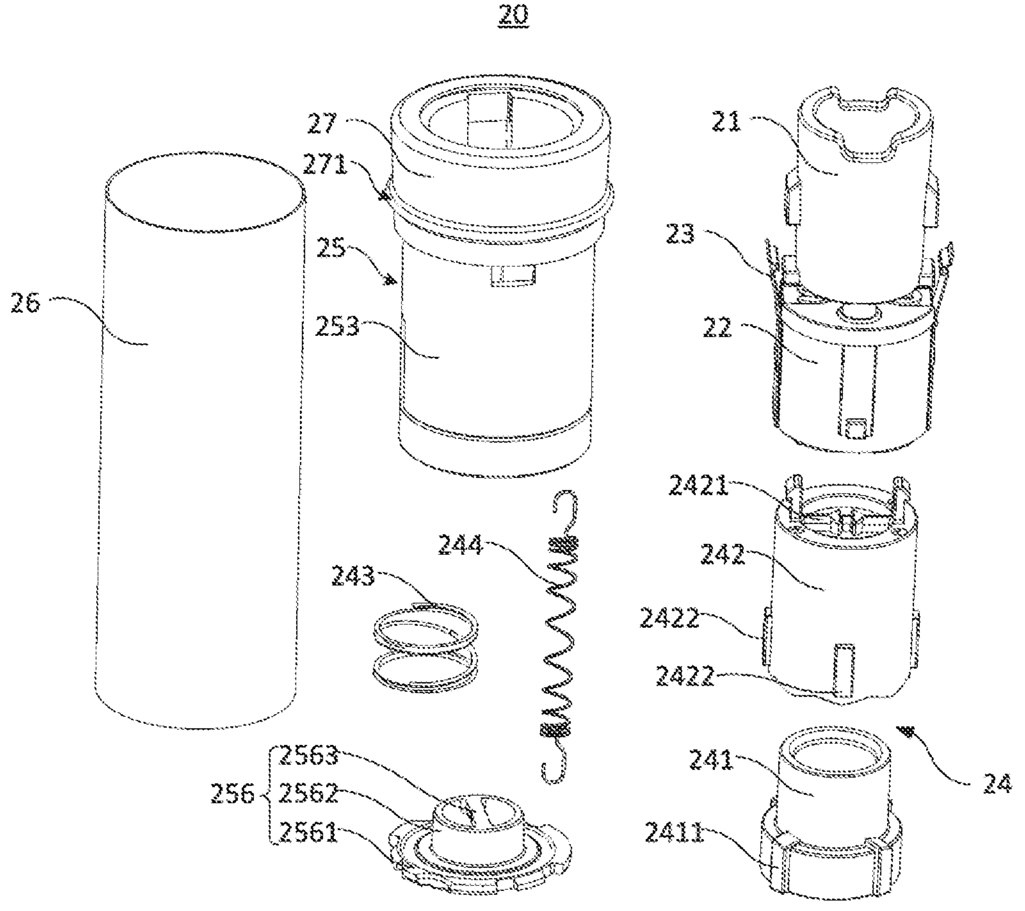
FIG. 6 is a schematic structural exploded view of the heating assembly shown in FIG. 5.

As shown in FIG. 5 to FIG. 6, the heating assembly 20 includes a heating bowl 21, a base 22, an elastic engagement piece 23, a self-locking component 24, and a limiting component 25. The base 22 is connected to an end of the self-locking component 24 and is jointly accommodated in the limiting component 25 with the self-locking component 24. The self-locking component 24 has a locked state of being engaged with the limiting component 25 and an unlocked state of being disengaged from the limiting component 25. The heating bowl 21 is movably accommodated in the limiting component 25 and is supported by the base 22, and the heating bowl 21 is pressed against the self-locking component 24 through the base 22 to switch between the locked state and the unlocked state between the self-locking component 24 and the limiting component 25.

The heating bowl 21 is movable between a first position and a second position relative to the limiting component 25. The self-locking component 24 is switched from the locked state to the unlocked state when the heating bowl 21 is pressed at the first position.

The self-locking component 24 pushes the heating bowl 21 to move to the second position when the self-locking component 24 is switched from the locked state to the unlocked state. When the heating bowl 21 is pressed at the second position, the self-locking component 24 is pushed to move and the self-locking component 24 is switched from the unlocked state to the locked state.

When the heating bowl 21 is at the first position, the heating bowl 21 is accommodated in the limiting component 25. When the heating bowl 21 is at the second position, the heating bowl 21 is at least partially located outside the limiting component 25, so that the user can easily disassemble the heating bowl 21 from the base 22 and assemble the heating bowl 21 on the base 22. In other words, by applying a pressing force to the heating bowl 21, the heating bowl 21 can be accommodated in the limiting component 25, or the heating bowl 21 can be lifted from the limiting component 25 until a part thereof is exposed outside the limiting component 25, so that the user can easily disassemble and assemble the heating bowl 21.

Figure 7:
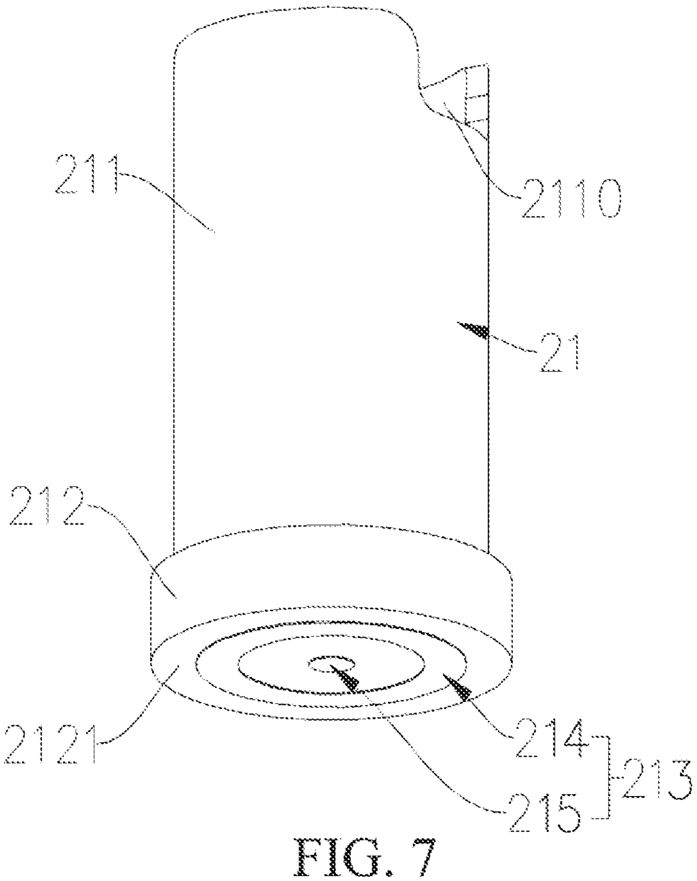
FIG. 7 is a schematic structural diagram of a heating bowl of the heating assembly shown in FIG. 6.
Figure 8:
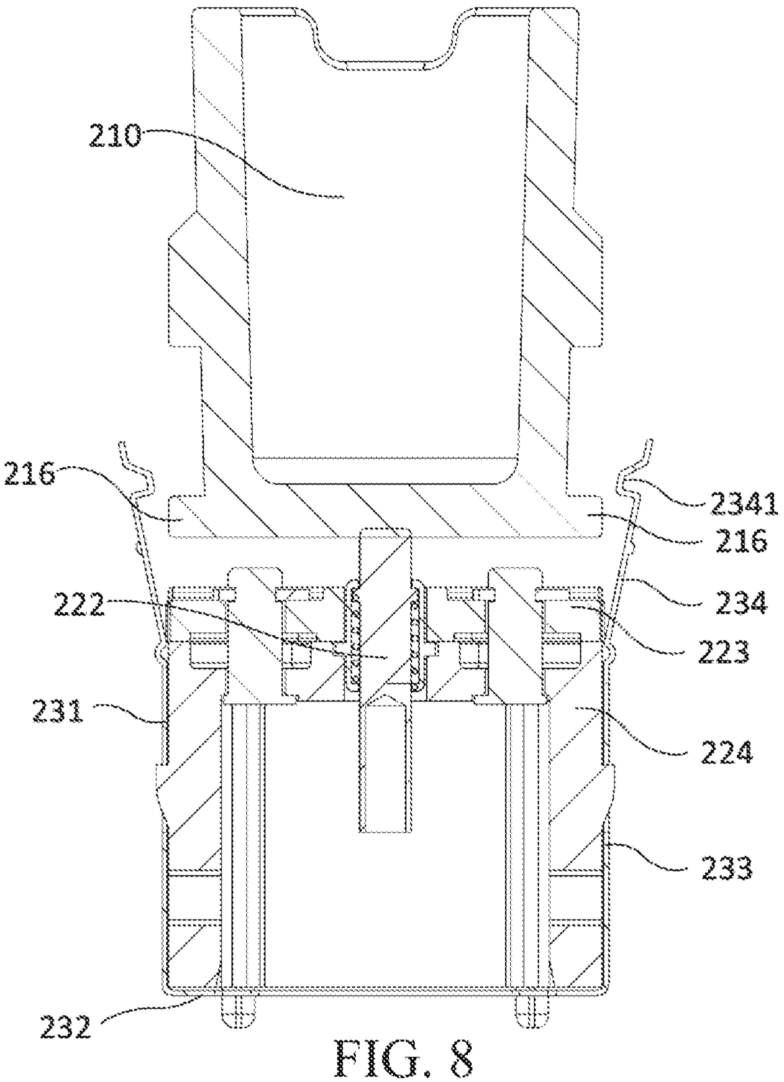
FIG. 8 is a schematic diagram of a cross-sectional structure of a heating bowl, a base, and an elastic engagement piece of the heating assembly shown in FIG. 5.

As shown in FIG. 7 and FIG. 8, the heating bowl 21 may be in a shape of a cylinder, an inner wall surface of the heating bowl 21 defines the vaporization cavity 210 configured to accommodate the aerosol-forming substrate, and at least one vent opening 2110 configured to communicate the vaporization cavity 210 with the first air outlet 1131 may be further formed on a side wall of the heating bowl 21.

The heating bowl 21 may be made of a ceramic material, for example, an environmentally friendly ceramic material such as alumina, aluminum nitride, or silicon nitride, which is harmless to a human body when heated at high temperature. The heating bowl 21 has a heating surface 2121. The heating element 213 is arranged on the heating surface 2121 and is configured to generate heat after being energized.

Specifically, in this embodiment, the heating bowl 21 includes a bowl body 211 and a bowl bottom 212 located at a bottom of the bowl body 211. An outer diameter of the bowl body 211 is less than an outer diameter of the bowl bottom 212. Two vent openings 2110 are symmetrically arranged on two sides of the bowl body 211 in a circumferential direction. Each of the vent openings 2110 may be formed by extending downward on a top surface of a side wall of the bowl body 211. The two vent openings 2110 may be respectively arranged corresponding to the two first air outlets 1131. That is, a line connecting the two second vent openings 2110 may be parallel to the line connecting the two first air outlets 1131. It may be understood that in other embodiments, an included angle may be formed between the line connecting the two vent opening s 2110 and the line connecting the two first air outlets 1131. For example, the included angle is 90 degrees.

A bottom surface of the bowl bottom 212 forms the heating surface 2121 for arranging the heating element 213. The heating element 213 includes a heating body. The heating body may be a heating film and may be formed on the heating surface 2121 by screen printing or the like. It may be understood that in other embodiments, the heating body is not limited to the heating film. For example, the heating body may alternatively be a metal heating sheet. In this embodiment, the heating element 213 further includes an annular first electrode portion 214 electrically connected to one electrode of the heating body and a second electrode portion 215 electrically connected to an other electrode of the heating body and located inside the first electrode portion 214. The second electrode portion 215 is annular and is located in a middle portion of the bottom surface of the bowl bottom 212, the first electrode portion 214 surrounds the second electrode portion 215 and is arranged coaxially with the second electrode portion 215, and an inner diameter of the first electrode portion 214 is greater than an outer diameter of the second electrode portion 215. The arrangement of the electrode portions avoids alignment of the heating bowl 21 during assembly, and achieves a foolproof effect.

Figure 9:
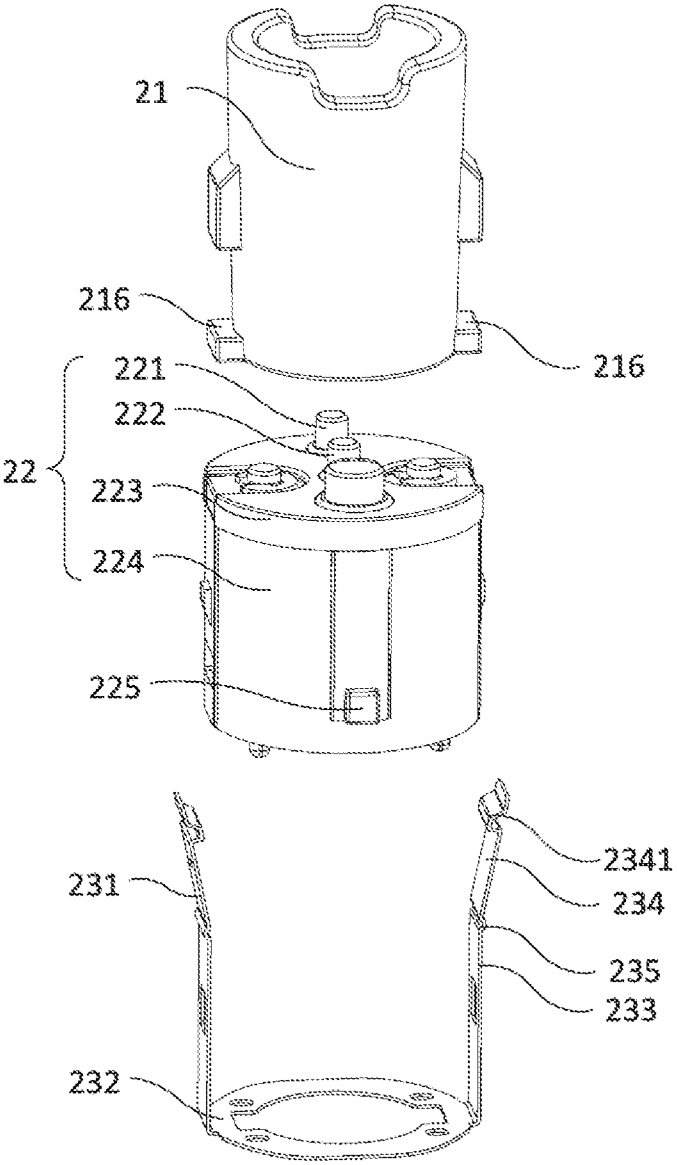
FIG. 9 is a schematic structural exploded view a heating bowl, a base, and an elastic engagement piece of the heating assembly shown in FIG. 5.

As shown in FIG. 8 and FIG. 9, the base 22 is provided with a first electrode 221 and a second electrode 222, and the base 22 is configured to carry the heating bowl 21, where the first electrode 221 and the second electrode 222 are configured to be electrically connected to the heating bowl 21.

The base 22 may be made of a ceramic material. In other embodiments, the base may be made of other materials such as plastic. The base 22 may include a base body 223 and a cover body 224, the base body 223 engages with the cover body 224 to clamp and fix the first electrode 221 and the second electrode 222, and the first electrode 221 and the second electrode 222 run through the cover body 224 to extend toward a bowl bottom 212 of the heating bowl 21, and are configured to be electrically connected to the first electrode portion 214 and the second electrode portion 215 correspondingly; the base body 223 and the cover body 224 are connected and fixed by a fastener, for example, a bolt and a circlip may be used; and both the base body 223 and the cover body 224 are accommodated in the limiting component 25, and at least one limiting portion 225 extends outward from a side wall of the base body 223. The at least one limiting portion 225 is configured to limit a position of the base 22 in the limiting component 25.

In this embodiment, two limiting portions 225 are arranged. The two limiting portions 225 are respectively arranged on two opposite sides of the base body 223.

Both the first electrode 221 and the second electrode 222 are elastic electrodes, and elastically abut against the first electrode portion 214 and the second electrode portion 215 respectively, and contact and are connected to the first electrode portion 214 and the second electrode portion 215. In this embodiment, both the first electrode 221 and the second electrode 222 are elastic electrode poles.

Optionally, both the first electrode 221 and the second electrode 222 are metal elastic sheets.

As shown in FIG. 8 to FIG. 11, an elastic engagement piece 23 is arranged on the base 22, and is configured to lock the heating bowl 21 on the base 22 when heated, and release the heating bowl 21 at normal temperature. The elastic engagement piece 23 is made of a composite material, which is naturally deformed in a fixed direction in a case of high temperature, and can automatically return to an original state after cooling. When the heating bowl 21 is heated to release heat, the elastic engagement piece 23 is deformed by the heat to lock the heating bowl 21, which may further prevent the heating bowl 21 from shaking during use; and The heating bowl 21 stops heating, and the elastic engagement piece 23 restores to an original shape after natural cooling and releases the heating bowl 21, so that the heating bowl 21 can be freely disassembled from the base 22 and assembled on the base 22.

The elastic engagement piece 23 includes two elastic arms 231 and a connection portion 232, and the two elastic arms 231 are connected to two sides of the connection portion 232. The two elastic arms 231 are arranged symmetrically to each other. When the elastic engagement piece 23 is in an original state and the elastic arms 231 are not heated, the two elastic arms 231 are in an open state.

Figure 10:
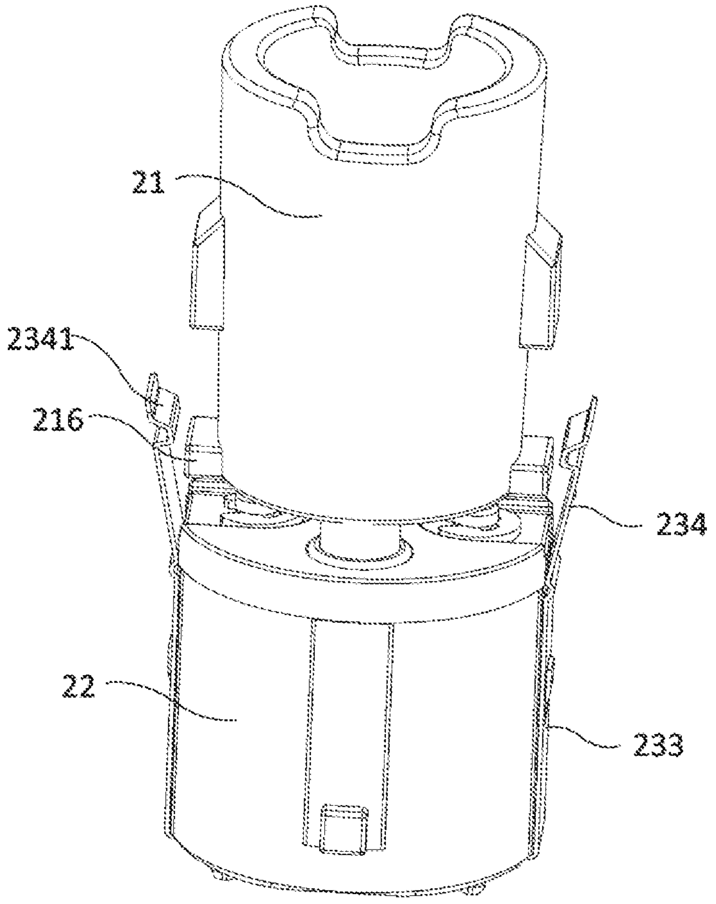
FIG. 10 is a schematic diagram of a state of releasing a heating bowl from an elastic engagement piece of the heating assembly shown in FIG. 5.
Figure 11:
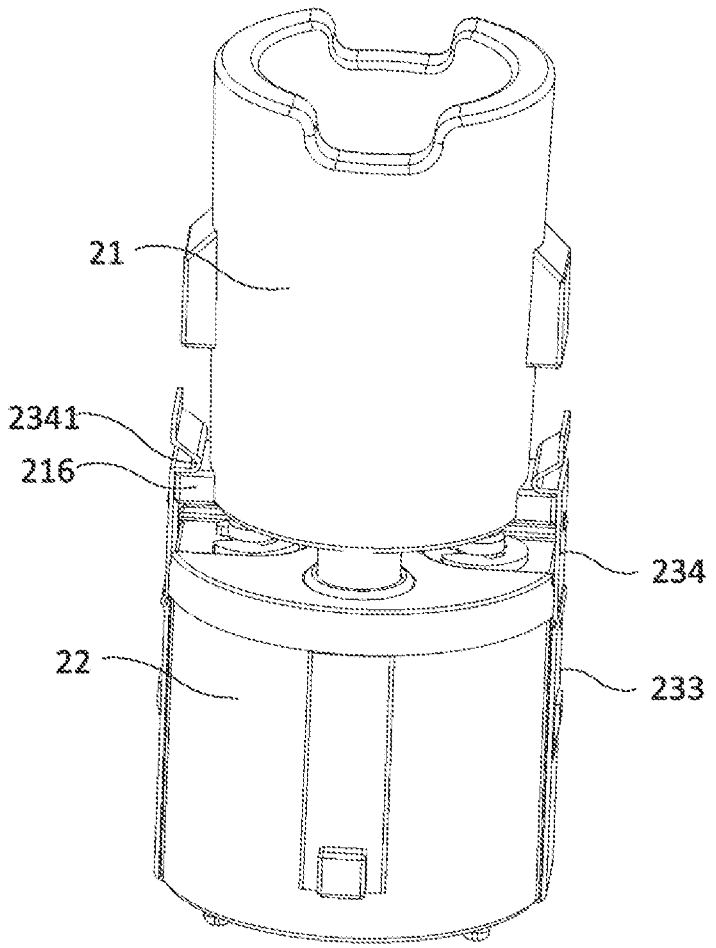
FIG. 11 is a schematic diagram of a state of locking a heating bowl by an elastic engagement piece of the heating assembly shown in FIG. 5.

As shown in FIG. 11, in a heated state, the two elastic arms 231 are heated and deformed inward, so as to lock the heating bowl 21; and as shown in FIG. 10, at normal temperature, the two elastic arms 231 are released from a heating constraint and restore to open outward, so as to release the heating bowl 21.

As shown in FIG. 8 and FIG. 9, each of the elastic arms 231 includes a connected deformable section 234 and non-deformable section 233, the non-deformable section 233 is attached to a side wall of the base 22, the deformable section 234 of each of the two elastic arms 231 is in an open state at normal temperature, and the deformable section 234 is deformed inward when heated, so as to lock the heating bowl 21.

The connection portion 232 is in a shape of a sheet and is detachably connected to a bottom of the base 22 away from the heating bowl 21. In this embodiment, the connection portion 232 is fixed to the bottom of the base 22 through an engagement structure, and the connection portion 232 may also be fixed on the base 22 by a screw. Further, the non-deformable section 233 is clamped to the side wall of the base 22, to cause the non-deformable section 233 to be fixed to the side wall of the base 22.

Because the non-deformable section 233 is clamped and fixed to the side wall of the base 22, the non-deformable section 233 cannot be elastically deformed whether the non-deformable section 233 is heated or not. Initially, the deformable section 234 is bent outward relative to the non-deformable section 233, that is, the two deformable sections 234 are in an open state. After being heated, the two deformable sections 234 are deformed inward and finally engaged on the heating bowl 21 to lock the heating bowl 21; and the two deformable sections 234 restore to an original state after cooling, and release the heating bowl 21.

The deformable section 234 and the non-deformable section 233 are connected by an arched section 235, and the arched section 235 helps to reduce the difficulty that the deformable section 234 is deformed relative to the non-deformable section 233, to cause the deformable section 234 to deform inward and restore to the original state more easily. That is, the elastic engagement piece 23 locks the heating bowl 21 or releases the heating bowl 21 more quickly.

Specifically, two protruding portions 216 extend outward from the bowl bottom 212, and an end of the deformable section 234 away from the non-deformable section 233 is bent inward to form a locking portion 2341 configured to lock the heating bowl 21. After the deformable section 234 is heated and deformed inward, the locking portion 2341 is engaged on each of the protruding portions 216 to lock the heating bowl 21.

Optionally, the bowl bottom 212 or the side wall of the heating bowl 21 may further be provided with an engagement groove. After the deformable section 234 is heated and deformed inward, the locking portion 2341 is engaged in the engagement groove.

Figure 12:
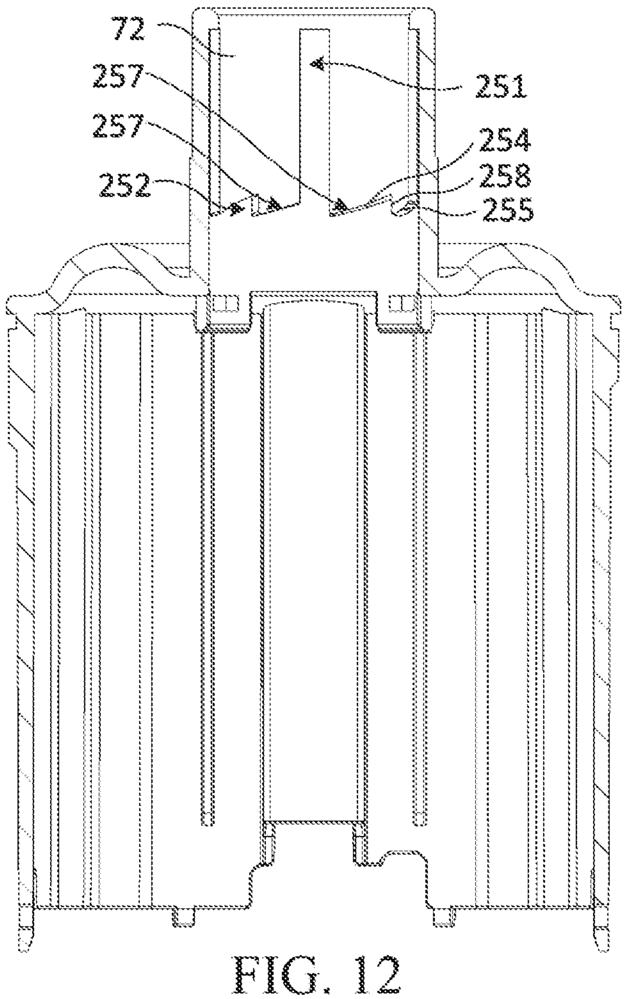
FIG. 12 is a schematic diagram of a cross-sectional structure of a bracket of the heating assembly shown in FIG. 5.

As shown in FIG. 5 and FIG. 12, a side wall of the limiting component 25 is provided with a first engagement groove 251 and a second engagement groove 252; and the self-locking component 24 includes a self-locking piece 241, and the self-locking piece 241 is engaged with the first engagement groove 251 or the second engagement groove 252 to lock or unlock the self-locking component 24.

The limiting component 25 includes a limiting tube 253, the limiting tube 253 may be an integral cylindrical tube, and may also include a plurality of tube bodies that are docked with each other, and even a sleeve portion 72 may also constitute a part of the limiting component 25.

In this embodiment, the limiting component 25 includes the limiting tube 253 and the sleeve portion 72. The limiting tube 253 is docked with the sleeve portion 72 and the limiting tube 253 and the sleeve portion 72 jointly constitute a limiting space of the limiting component 25. Optionally, the limiting tube 253 and the sleeve portion 72 form a tube body in an integral structure, and the sleeve portion 72 is separated from a bracket body 71 and abuts against the bracket body 71. A side wall of the sleeve portion 72 is provided with a first engagement groove 251 and a second engagement groove 252, and the limiting tube 253 is docked with the sleeve portion 72.

Optionally, the limiting component 25 includes a limiting tube 253, and a side wall of the limiting tube 253 is provided with a first engagement groove 251 and a second engagement groove 252. The limiting tube 253 is docked with the sleeve portion 72, and the sleeve portion 72 only plays the role of positioning the heating assembly 20; or the limiting component 25 includes the limiting tube 253 and the sleeve portion 72, the side wall of the sleeve portion 72 is provided with the first engagement groove 251, and the side wall of the limiting tube 253 is provided with the second engagement groove 252.

As shown in FIG. 5, FIG. 6, and FIG. 11, the self-locking component 24 includes a support piece 242 that is slidably accommodated in the limiting component 25 and the self-locking piece 241, the support piece 242 is connected to the base 22, and the self-locking piece 241 is arranged on an end of the support piece 242 away from the base 22.

The support piece 242 is engaged on the base 22 and jointly clamps the connection portion 232 of the elastic engagement piece 23 with the base 22. The support piece 242 presses the self-locking piece 241, to cause the self-locking piece 241 to be first engaged in the first engagement groove 251 and then engaged in the second engagement groove 252 to unlock the self-locking component 24, and in addition, the support piece 242 carries the heating bowl 21 to move from the first position to the second position; or to cause the self-locking piece 241 to be first engaged with the second engagement groove 252 and then engaged with the first engagement groove 251, so as to lock the self-locking component 24, and the support piece 242 carries the heating bowl 21 to move from the second position to the first position.

The support piece 242 presses the self-locking piece 241, to cause the self-locking piece 241 plays the role of switching, that is, the self-locking piece 241 is first engaged in the first engagement groove 251 and then engaged in the second engagement groove 252. When the self-locking piece 241 is engaged in the second engagement groove 252, the self-locking piece 241 carries the support piece 242, the base 22, and the heating bowl 21 to ascend, so that the heating bowl 21 ascends from the first position to the second position.

In this embodiment, the self-locking component 24 further includes a first elastic piece 243 and a second elastic piece 244, two ends of the first elastic piece 243 are respectively connected to the self-locking piece 241 and the limiting component 25, and two ends of the second elastic piece 244 are respectively connected to the support piece 242 and the limiting component 25, where the first elastic piece 243 is configured to push the heating bowl 21 to move to the second position.

By arranging the first elastic piece 243, the elastic force of the first elastic piece 243 is used to push the self-locking piece 241 to ascend in a longitudinal direction when the self-locking component 24 is switched to the unlocked state, so that the heating bowl 21 rises to the second position, which is convenient for the user to disassemble and assemble the heating bowl 21; and the second elastic piece 244 is configured to keep the support piece 242 in contact with the self-locking piece 241 to prevent the support piece 242 from shaking up and down, so as to enhance the stability of the self-locking component 24.

The limiting component 25 further includes a base 256, the base 256 is arranged on an end of the sleeve portion 72 away from the limiting tube 253, the first elastic piece 243 is elastically compressed and arranged between the base 256 and the self-locking piece 241, and the second elastic piece 244 is elastically stretched and arranged between the base 256 and the support piece 242.

The base 256 includes a bottom wall 2561 and a positioning cylinder 2562 arranged on the bottom wall 2561, both the first elastic piece 243 and the second elastic piece 244 are compression springs and are sleeved on each other, where one end of the first elastic piece 243 is sleeved on an outer periphery of the positioning cylinder 2562 and pressed against the bottom wall 2561, and the other end of the first elastic piece 243 is pressed against the self-locking piece 241; and a first beam 2563 is formed in the positioning cylinder 2562, a second beam 2421 is formed on the support piece 242, and two ends of the second elastic piece 244 are respectively connected to the first beam 2563 and the second beam 2421, and are elastically stretched and arranged, so as to press the support piece 242 on the self-locking piece 241.

Optionally, the heating assembly 20 may further include a power machine, so as to replace the first elastic piece 243 and second elastic piece 244 with the power machine. When the self-locking component 24 is in the unlocked state, the power machine provides power to push the self-locking piece 241 to ascend upward along a longitudinal direction. For example, the power machine is a stepping motor or a miniature cylinder.

Both the support piece 242 and the self-locking piece 241 have a cylindrical structure, one end of the self-locking piece 241 is inserted in the support piece 242, and the support piece 242 is slidably assembled with the second engagement groove 252, and ascends or descends along the second engagement groove 252. The self-locking piece 241 is cyclically switched to be engaged with the first engagement groove 251 and the second engagement groove 252, where the self-locking piece 241 ascends or descends and circles relative to the support piece 242 to switch between being engaged in the first engagement groove 251 and being engaged in the second engagement groove 252.

As shown in FIG. 12, in this embodiment, the side wall of the limiting component 25 is provided with a plurality of first engagement grooves 251 and a plurality of second engagement grooves 252, the plurality of first engagement grooves 251 and second engagement grooves 252 are circumferentially provided on the side wall of the limiting component 25, the first engagement grooves 251 and the second engagement grooves 252 are alternately provided, and a side wall of each of the second engagement grooves 252 is connected to side walls of two adjacent first engagement grooves 251 on two sides through a first guide wall 254 and a second guide wall 255 respectively, where the support piece 242 is pushed against so that the self-locking piece 241 is first engaged with each of the first engagement grooves 251 and then engaged with each of the second engagement grooves 252 along the first guide wall 254, or the support piece 242 is pushed against so that the self-locking piece 241 is first engaged with each of the second engagement grooves 252 and then engaged with each of the first engagement grooves 251 along the second guide wall 255.

Specifically, the side wall of the limiting component 25 is arranged circumferentially with a plurality of first engagement grooves 251 and a plurality of second engagement grooves 252, and the first engagement grooves 251 and the second engagement grooves 252 are alternately provided. The side wall of the limiting component 25 is further provided with a block wall 258 that is bent and is connected to both the first guide wall 254 and the second guide wall 255, where the block wall 258 and the second guide wall 255 form two adjacent side walls of each of the first engagement grooves 251.

Figure 13:
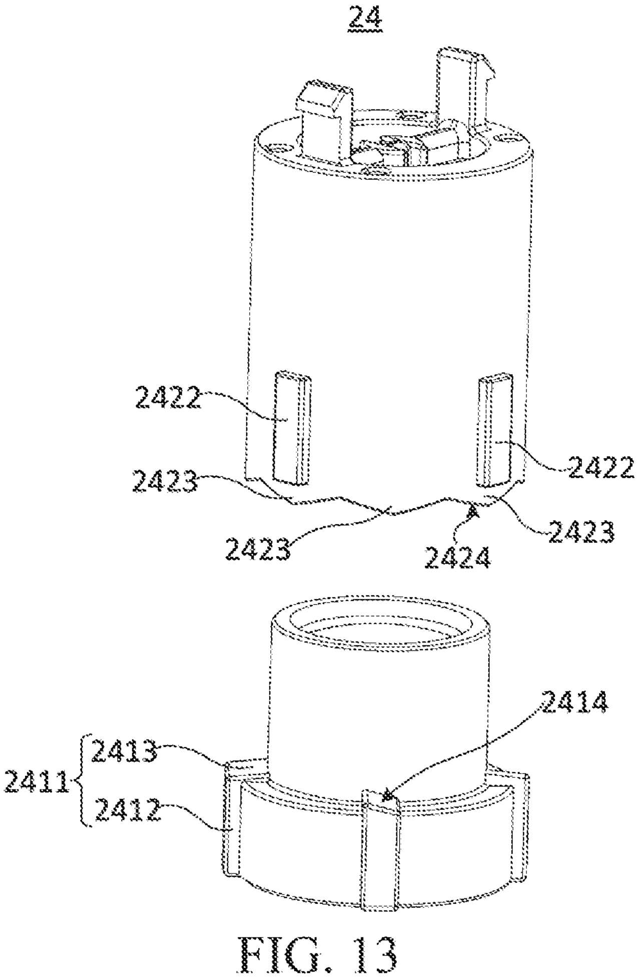
FIG. 13 is a schematic structural exploded view of a self-locking component of the heating assembly shown in FIG. 5.

As shown in FIG. 12 and FIG. 13, a slidable block 2422 that protrudes outward is formed on a side wall of the support piece 242, and the slidable block 2422 is slidably arranged in each of the second engagement grooves 252; and an abutting wall 2423 that protrudes toward an end portion of the self-locking piece 241 is formed on the support piece 242, and an abutting wall surface 2424 of the abutting wall 2423 is parallel to guide wall surfaces 257 of the first guide wall 254 and the second guide wall 255.

A bump 2411 is formed on the side wall of the self-locking piece 241, and the bump 2411 includes a first sliding portion 2412 and a second sliding portion 2413, where the first sliding portion 2412 is located on the outer side surface of the side wall of the self-locking piece 241, and the second sliding portion 2413 is located at the end portion of the side wall of the self-locking piece 241 facing toward the support piece 242.

The first sliding portion 2412 is configured to slide-fit each of the second engagement grooves 252, the second sliding portion 2413 is configured to be engaged with each of the first engagement grooves 251, the second sliding portion 2413 is provided with a sliding wall surface 2414 abutting against the abutting wall surface 2424, and the sliding wall surface 2414 is arranged parallel to the guide wall surfaces 257, where the second sliding portion 2413 slides along the abutting wall surface 2424 to match with the guide wall surface 257 of the first guide wall 254 or the second guide wall 255, and slide to each of the second engagement grooves 252 along the first guide wall 254, or slide to each of the first engagement grooves 251 along the second guide wall 255.

The guide wall surface 257, the abutting wall surface 2424, and the sliding wall surface 2414 are all inclined planes with the same slope, the guide wall surface 257 of the first guide wall 254 gradually ascends along a longitudinal direction from one end connected to each of the first engagement grooves 251 to one end connected to each of the second engagement grooves 252, and the guide wall surface 257 of the second guide wall 255 gradually ascends along a longitudinal direction from one end connected to each of the second engagement grooves 252 to one end connected to each of the first engagement grooves 251.

Specifically, in an actual application, a user presses the heating bowl 21 to cause the second sliding portion 2413 to be disengaged from a circumferential limit of each of the second engagement grooves 252, the self-locking piece 241 rotates in a circumferential direction relative to the support piece 242 under the pressure of the abutting wall surface 2424 against the sliding wall surface 2414, so that the sliding wall surface 2414 of the second sliding portion 2413 slide-fits the guide wall surface 257 of the second guide wall 255, so as to be engaged in each of the first engagement grooves 251. In addition, the block wall 258 circumferentially limits the second sliding portion 2413, and the second guide wall 255 longitudinally limits the second sliding portion 2413, so as to lock the self-locking component 24.

The user presses the heating bowl 21 again, to cause the second sliding portion 2413 to be disengaged from each of the first engagement grooves 251, and then rotate in a circumferential direction again relative to the support piece 242, and to cause the sliding wall surface 2414 of the second sliding portion 2413 to slide-fit the guide wall surface 257 of the first guide wall 254, and to be engaged with each of the second engagement grooves 252 along the first guide wall 254, thereby unlocking the self-locking component 24. In addition, the support piece 242 is pushed upward along each of the second engagement grooves 252, to cause at least a part of the heating bowl 21 to be exposed outside the limiting component 25.

In this embodiment, each of the first engagement grooves 251 and each of the second engagement grooves 252 are arranged on the side wall of the sleeve portion 72.

As shown in FIG. 5 and FIG. 6, the heating assembly 20 may further include an outer tube 26 and a seal sleeve 27.

The outer tube 26 is tubular and is sleeved outside the limiting component 25. The outer tube may be made of a metal material. In other embodiments, the outer tube 26 may also be made of other materials such as plastic. A lower end of the outer tube 26 may be sleeved on the sleeve portion 72 of the main unit 200, and a lower end surface thereof may abut against an upper end surface of the holder 70. The seal sleeve 27 is sleeved outside an upper end of the outer tube 26, and may be made of an elastic material such as silica gel. An annular flange 271 that extends outward along a radial direction may be formed on an outer wall surface of the seal sleeve 27. The annular flange 271 abuts against a cavity wall of the accommodating cavity 1130 and is hermetically engaged with the cavity wall of the accommodating cavity 1130, so that air leakage can be prevented.

Different from a situation in the related art, this application discloses an electronic vaporization device and a vaporizer and a heating assembly thereof. A heating bowl is locked or released by arranging an elastic engagement piece, where the elastic engagement piece is arranged on a base, which is configured to lock the heating bowl on the base when heated, and release the heating bowl at normal temperature, so that the heating bowl can be disassembled or assembled very conveniently and quickly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A heating assembly, comprising:

a heating bowl;

a base comprising a first electrode and a second electrode, the base being configured to carry the heating bowl, the first electrode and the second electrode being configured to be electrically connected to the heating bowl; and an elastic engagement piece arranged on the base, the elastic engagement piece being configured to lock the heating bowl on the base when heated, and release the heating bowl at an open state, the elastic engagement piece including two elastic arms and a connection portion, wherein the two elastic arms are connected to two sides of the connection portion, and the connection portion is detachably connected to an end of the base away from the heating bowl.

2. The heating assembly of claim 1, wherein, in a heated state, the two elastic arms are heated and deformed inward so as to lock the heating bowl, and wherein, at the open state, the two elastic arms are released from a heating constraint and restore to open outward so as to release the heating bowl.

3. The heating assembly of claim 2, wherein each of the elastic arms comprises a connected deformable section and non-deformable section, the non-deformable section being attached to a side wall of the base, the deformable section of each of the two elastic arms being in an open state at room temperature, and the deformable section being deformed inward when heated so as to lock the heating bowl.

4. The heating assembly of claim 3, wherein the non-deformable section is clamped to the side wall of the base.

5. A heating assembly comprising:

a heating bowl;

a base comprising a first electrode and a second electrode, the base being configured to carry the heating bowl, the first electrode and the second electrode being configured to be electrically connected to the heating bowl;

an elastic engagement piece arranged on the base, the elastic engagement piece being configured to lock the heating bowl on the base when heated, and release the heating bowl at an open state;

a limiting component, the base and the heating bowl being movably accommodated in the limiting component, and the heating bowl being movable between a first position and a second position relative to the limiting component; and a self-locking component accommodated in the limiting component and connected to the base, the self-locking component having a locked state of being engaged with the limiting component and an unlocked state of being disengaged from the limiting component, wherein the heating bowl is pressed against the base, and the self-locking component is switched from the locked state to the unlocked state when the heating bowl is pressed at the first position;

wherein the self-locking component is configured to push the heating bowl to move to the second position when the self-locking component is switched from the locked state to the unlocked state, and wherein, when the heating bowl is pressed at the second position, the self-locking component is configured to be pushed to move and the self-locking component is switched from the unlocked state to the locked state.

6. The heating assembly of claim 5, wherein a side wall of the limiting component is provided with a first engagement groove and a second engagement groove, wherein the self-locking component comprises a self-locking piece, and wherein the self-locking piece is configured to be engaged with the first engagement groove or the second engagement groove to lock or unlock the self-locking component.

7. The heating assembly of claim 6, wherein the self-locking component comprises a support piece that is slidably accommodated in the limiting component and the self-locking piece, the support piece is connected to the base, and the self-locking piece is arranged at an end of the support piece away from the base, wherein the support piece is configured to press against the self-locking piece so as to cause the self-locking piece to be first engaged with the first engagement groove and then engaged with the second engagement groove so as to unlock the self-locking component, or so as to cause the self-locking piece to be first engaged with the second engagement groove and then engaged with the first engagement groove so as to lock the self-locking component.

8. The heating assembly of claim 7, wherein the side wall of the limiting component is provided with a plurality of first engagement grooves and a plurality of second engagement grooves, the plurality of first engagement grooves and the plurality of second engagement grooves being circumferentially provided on the side wall of the limiting component, the first engagement grooves and the second engagement grooves being alternately provided, and a side wall of each of the second engagement grooves being connected to side walls of two adjacent first engagement grooves on two sides through a first guide wall and a second guide wall respectively, and wherein the self-locking piece is first engaged with each of the first engagement grooves and then engaged with each of the second engagement grooves along the first guide wall, and the self-locking piece is first engaged with each of the second engagement grooves and then engaged with each of the first engagement grooves along the second guide wall.

9. The heating assembly of claim 8, wherein a slidable block that protrudes outward is formed on a side wall of the support piece, the slidable block being slidably arranged in each of the second engagement grooves, wherein an abutting wall that protrudes toward an end portion of the self-locking piece is formed on the support piece, and an abutting wall surface of the abutting wall is parallel to guide wall surfaces of the first guide wall and the second guide wall, wherein a bump is formed on a side wall of the self-locking piece, the bump comprising a first sliding portion and a second sliding portion, the first sliding portion being configured to slide-fit each of the second engagement grooves, the second sliding portion being configured to be engaged with each of the first engagement grooves, the second sliding portion being provided with a sliding wall surface abutting against the abutting wall surface, and the sliding wall surface being arranged parallel to the guide wall surfaces, and wherein the second sliding portion is configured to slide along the abutting wall surface to match with the guide wall surface of the first guide wall or the second guide wall.

10. The heating assembly of claim 7, wherein the self-locking component further comprises a first elastic piece and a second elastic piece, two ends of the first elastic piece being respectively connected to the self-locking piece and the limiting component, and two ends of the second elastic piece being respectively connected to the support piece and the limiting component, and wherein the first elastic piece is configured to push the heating bowl to move to the second position.

11. An electronic vaporization device comprising:

a battery; and a heating assembly including a heating bowl;

a base comprising a first electrode and a second electrode, the base being configured to carry the heating bowl, the first electrode and the second electrode being configured to be electrically connected to the heating bowl; and an elastic engagement piece arranged on the base, the elastic engagement piece being configured to lock the heating bowl on the base when heated, and release the heating bowl at an open state, the elastic engagement piece including two elastic arms and a connection portion, wherein the two elastic arms are connected to two sides of the connection portion, the connection portion is detachably connected to an end of the base away from the heating bowl, and the battery is electrically connected to the heating assembly.

* * * * *